(12) United States Patent
Liu et al.

(10) Patent No.: US 10,756,332 B2
(45) Date of Patent: Aug. 25, 2020

(54) METHOD OF FABRICATING ANODE MATERIAL FOR SECONDARY BATTERY

(71) Applicant: Chung Yuan Christian University, Taoyuan (TW)

(72) Inventors: Wei-Jen Liu, Taoyuan (TW); Shing-Yu Tsai, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 195 days.

(21) Appl. No.: 15/987,927

(22) Filed: May 24, 2018

(65) Prior Publication Data

US 2019/0296330 A1 Sep. 26, 2019

(30) Foreign Application Priority Data

Mar. 20, 2018 (TW) .............................. 107109521 A

(51) Int. Cl.
| | |
|---|---|
| H01M 4/1393 | (2010.01) |
| H01M 4/04 | (2006.01) |
| H01M 4/36 | (2006.01) |
| H01M 10/0525 | (2010.01) |
| H01M 4/62 | (2006.01) |
| H01M 4/90 | (2006.01) |
| H01M 4/96 | (2006.01) |
| H01M 4/583 | (2010.01) |
| H01M 4/133 | (2010.01) |

(52) U.S. Cl.
CPC ....... *H01M 4/1393* (2013.01); *H01M 4/0471* (2013.01); *H01M 4/364* (2013.01); *H01M 10/0525* (2013.01); *H01M 4/133* (2013.01); *H01M 4/583* (2013.01); *H01M 4/625* (2013.01); *H01M 4/9083* (2013.01); *H01M 4/96* (2013.01)

(58) Field of Classification Search
None
See application file for complete search history.

(56) References Cited

U.S. PATENT DOCUMENTS

| | | | | |
|---|---|---|---|---|
| 6,355,221 | B1 * | 3/2002 | Rappas | .................. C01B 7/192 |
| | | | | 423/158 |
| 2011/0309291 | A1 * | 12/2011 | Sugiura | ................ C01G 31/006 |
| | | | | 252/182.1 |
| 2012/0177995 | A1 | 7/2012 | Sun et al. | |
| 2014/0220459 | A1 * | 8/2014 | Iida | ..................... H01M 4/9083 |
| | | | | 429/405 |

(Continued)

FOREIGN PATENT DOCUMENTS

| | | |
|---|---|---|
| CN | 102820458 | 12/2012 |
| CN | 106356517 | 1/2017 |
| TW | 201711956 | 4/2017 |

OTHER PUBLICATIONS

"Office Action of Taiwan Counterpart Application", dated Nov. 19, 2018, p. 1-p. 7.

*Primary Examiner* — Jeremiah R Smith
(74) *Attorney, Agent, or Firm* — JCIPRNET

(57) ABSTRACT

A method of fabricating an anode material for a secondary battery includes following steps. A carbon-containing biomass material is provided. The carbon-containing biomass material is mixed with a solid-state nitrogen-containing precursor via a solid-phase mixing method to form a mixture. A sintering process is performed on the mixture to form a nitrogen-doped biomass carbon.

11 Claims, 5 Drawing Sheets

(56) References Cited

U.S. PATENT DOCUMENTS

| | | | |
|---|---|---|---|
| 2015/0017539 A1* | 1/2015 | Ito | H01M 4/587 |
| | | | 429/231.4 |
| 2016/0013517 A1* | 1/2016 | Nakazawa | H01M 10/052 |
| | | | 429/200 |
| 2017/0015559 A1* | 1/2017 | Costantino | C08L 77/12 |
| 2018/0190996 A1* | 7/2018 | Zhi | H01M 4/96 |

* cited by examiner

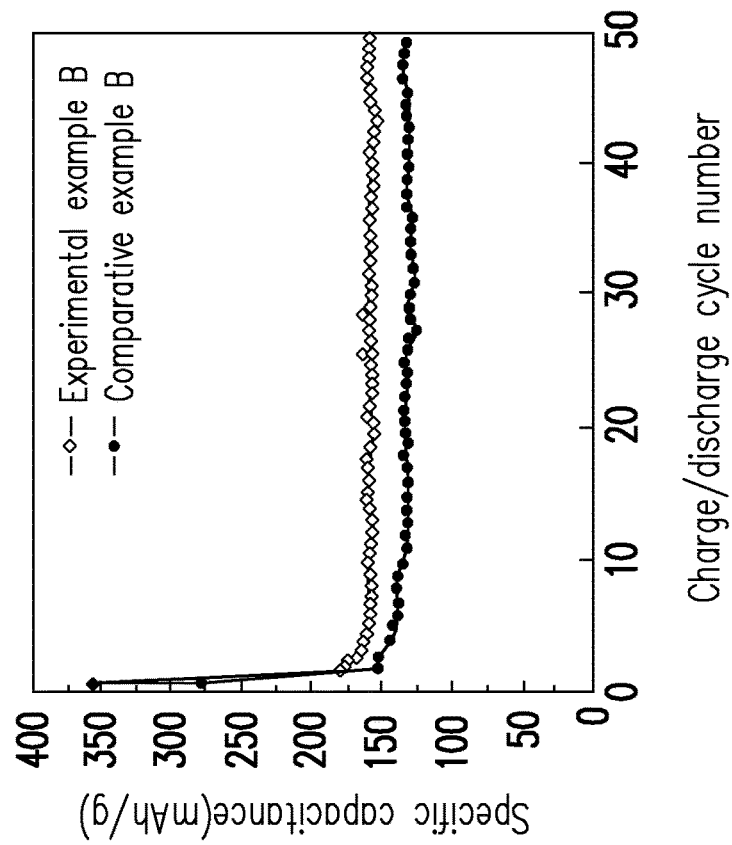
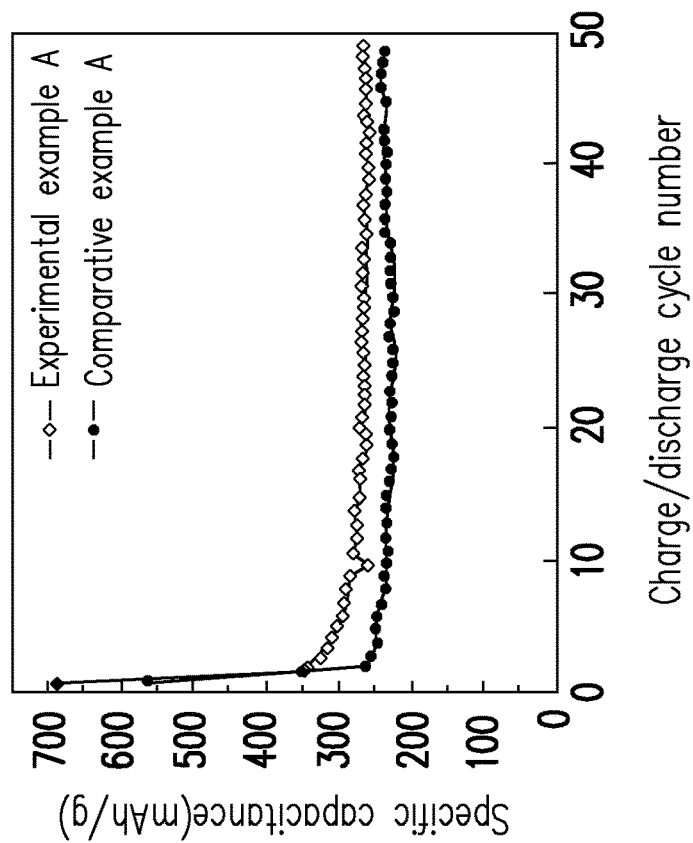
FIG. 3A
FIG. 3B

METHOD OF FABRICATING ANODE MATERIAL FOR SECONDARY BATTERY

CROSS-REFERENCE TO RELATED APPLICATION

This application claims the priority benefit of Taiwan application serial no. 107109521, filed on Mar. 20, 2018. The entirety of the above-mentioned patent application is hereby incorporated by reference herein and made a part of this specification.

BACKGROUND OF THE INVENTION

Field of the Invention

The invention relates to a method of fabricating an anode material for a secondary battery, and more particularly, to a method of fabricating an anode material for a lithium/sodium ion battery.

Description of Related Art

In recent years, handheld electronic devices such as smart phones and tablet computers have gradually been extensively applied in everyday life. With the development of the technology industry, the performance of handheld electronic devices is continuously increased, and therefore the battery (such as a lithium/sodium ion battery) of handheld devices also requires higher power output capability.

In general, graphite is used as the anode in a lithium/sodium ion battery, but graphite has an ordered and dense structure, and therefore the rapid charge/discharge capability of the lithium/sodium ion battery is limited. Moreover, rapid charge/discharge increases the AC impedance of the battery, such that the graphite material cannot achieve a deeper charging depth, and the capacity of the battery is affected as a result. Therefore, at present, research on many emerging anode materials is widely underway, and with the gradual emphasis on green energy, the use of biomass material as the anode of a secondary battery has become a focus of current research.

However, the structural defects of the biomass material result in issues such as poor capacity (such as a capacity less than 280 mAh/g) and higher irreversible capacity (such as 50% of total capacity) when the biomass material is used as the anode material of the secondary battery. Therefore, how to develop an anode material providing good rapid charge/discharge capability, low irreversible capacity, high capacity, and high cycle stability to a secondary battery is an object for those skilled in the art.

SUMMARY OF THE INVENTION

The invention provides a method of fabricating an anode material for a secondary battery that can provide good rapid charge/discharge capability, low irreversible capacitance, high capacity, and high cycle stability to the secondary battery.

The invention provides a method of fabricating an anode material for a secondary battery including the following steps. A carbon-containing biomass material is provided. The carbon-containing biomass material is mixed with a solid-state nitrogen-containing precursor via a solid-phase mixing method to form a mixture. A sintering process is performed on the mixture to form a nitrogen-doped biomass carbon.

In an embodiment of the invention, the carbon-containing biomass material includes coffee ground, coconut shell, dead leaf, or a combination thereof.

In an embodiment of the invention, the solid-state nitrogen-containing precursor includes an organic solid-state nitrogen source, an inorganic solid-state nitrogen source, or a combination thereof.

In an embodiment of the invention, the organic solid-state nitrogen source includes hexamethylenetetramine ($C_6H_{12}N_4$), ammonium benzoate ($C_6H_5COONH_4$), ammonium carbonate (($NH_4$)$_2CO_3$), ammonium citrate ($HOC(CO_2NH_4)(CH_2CO_2NH_4)_2$), ammonium formate ($HCO_2NH_4$), naphthalene carbonitrile ($C_{11}H_7N$), naphthalene dinitrile ($C_{10}H_6(CN)_2$), naphthalimide ($C_{12}H_7NO_2$), or a combination thereof.

In an embodiment of the invention, the inorganic solid-state nitrogen source includes inorganic nitrate.

In an embodiment of the invention, the weight ratio of the carbon-containing biomass material and the solid-state nitrogen-containing precursor is 1:10.

In an embodiment of the invention, the temperature of the sintering process is greater than or equal to 500° C. and less than or equal to 1000° C.

In an embodiment of the invention, the time of the sintering process is greater than or equal to 0.5 hours and less than or equal to 10 hours.

In an embodiment of the invention, after the nitrogen-doped biomass carbon is formed, the method of fabricating the anode material for the secondary battery further includes performing a polishing process on the nitrogen-doped biomass carbon.

In an embodiment of the invention, after the polishing process is performed, the method of fabricating the anode material for the secondary battery further includes performing a screening process on the nitrogen-doped biomass carbon via a sieve.

In an embodiment of the invention, the nitrogen-doped biomass carbon includes pyridinic N bond and pyrrolic N bond.

In an embodiment of the invention, the nitrogen content of the nitrogen-doped biomass carbon is greater than or equal to 0.05 mol % and less than or equal to 10 mol %.

In an embodiment of the invention, the secondary battery includes a lithium ion battery or a sodium ion battery.

Based on the above, in the method of fabricating an anode material for a secondary battery of the invention, a carbon-containing biomass material and a solid-state nitrogen-containing precursor are mixed via a solid-phase mixing method first to form a mixture, and then a sintering process is performed on the mixture to form a nitrogen-doped biomass carbon for the anode material of a secondary battery. As a result, the effect of nitrogen doping can be achieved without a complicated special process, such that the structure of the nitrogen-doped biomass carbon is stable, and the process thereof has the advantages of being simple and environmentally friendly. Moreover, the solid-phase mixing process can prevent common issues in a liquid-phase mixing process such as uneven mixing caused by an aggregation phenomenon and poor battery performance caused by a residual dispersant (to achieve well-mixed in liquid-phase) adsorbed on a material surface. Moreover, the solid-phase mixing process can omit other complicated processes (such as a liquid-phase mixing process requiring a water-removing process) to increase process stability.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A and FIG. 3B are respectively the relationship between charge/discharge cycle number and capacity of a lithium ion battery and a sodium ion battery.

DESCRIPTION OF THE EMBODIMENTS

Figure 1:
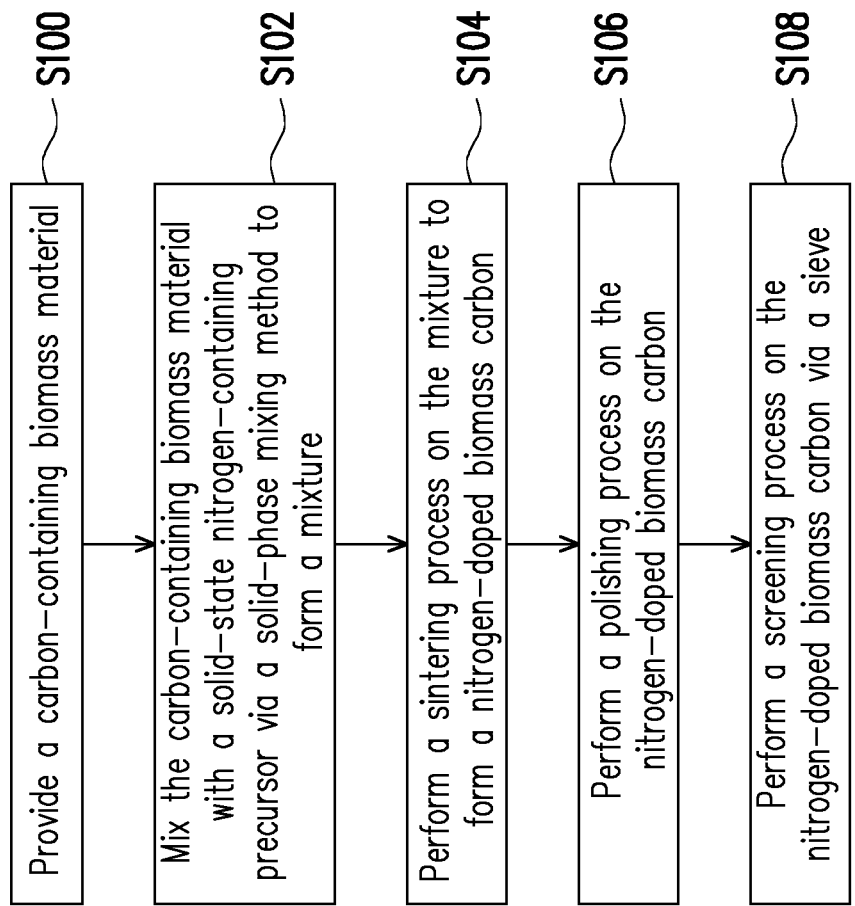
FIG. 1 is a flowchart of a method of fabricating an anode material for a secondary battery according to an embodiment of the invention.

Hereinafter, the invention is more comprehensively described with reference to the figures of the present embodiments. However, the invention can also be implemented in various different forms, and is not limited to the embodiments in the present specification. The same or similar reference numerals represent the same or similar devices and are not repeated in the following paragraphs. Moreover, terms used to describe direction in the following embodiments such as up, down, left, right, front, and back are only the directions of reference figures. Therefore, terms used to describe direction are descriptive and are not intended to limit the invention.

Figure 2A:
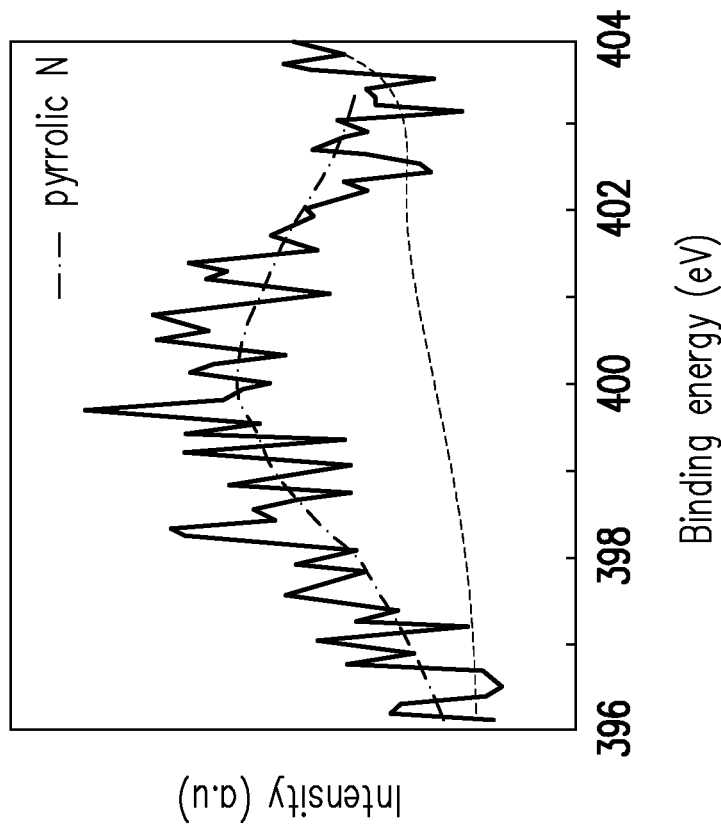
FIG. 2A is an XPS spectrum of the $N_{1s}$ orbital of experimental example 1.
Figure 2B:
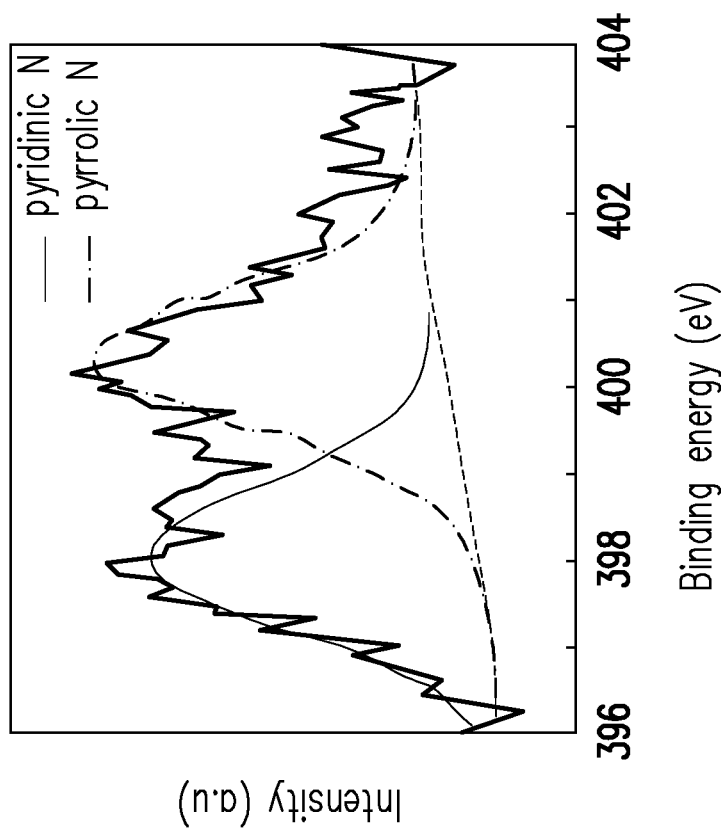
FIG. 2B is an XPS spectrum of the $N_{1s}$ orbital of comparative example 1.

FIG. 1 is a flowchart of a method of fabricating an anode material for a secondary battery according to an embodiment of the invention. FIG. 2A is an XPS spectrum of the $N_{1s}$ orbital of experimental example 1. FIG. 2B is an XPS spectrum of the $N_{1s}$ orbital of comparative example 1.

Referring to FIG. 1, step S100 is performed to provide a carbon-containing biomass material. The carbon-containing biomass material is, for instance, coffee ground, coconut shell, dead leaf, or a combination thereof. In some embodiments, a pretreatment process can be optionally performed on the carbon-containing biomass material. For instance, a pickling process or an alkali-washing process can be optionally performed on the carbon-containing biomass material to remove impurities or pollutants in the carbon-containing biomass material, but the invention is not limited thereto. In some other embodiments, a water-removing process (such as a baking process) or a carbonization treatment (such as a sintering process) can also be optionally performed on the carbon-containing biomass material. In the present embodiment, a carbon-containing biomass material is used as one of the raw materials of the anode material for a secondary battery, and since the carbon-containing biomass material has features such as lightweight, high porosity, good structural stability, and good conductivity, the carbon-containing biomass material can provide better specific capacity (capacity per weight) and tap density compared to commercial lithium/sodium ion batteries. Moreover, the carbon-containing biomass material has features such as no pollution and renewability, and therefore the method of fabricating an anode material for a secondary battery has the advantage of being environmentally friendly. In the present embodiment, the secondary battery can be a lithium ion battery or a sodium ion battery. It should be mentioned that, the biomass material in the present specification may be best understood to the materials contained the biological carbon atoms which determined by the ASTM method D6866-10 titled "Standard Test Methods for Determining the Biobased Content of Solid, Liquid and Gaseous samples using Radiocarbon Analysis".

Next, step S102 is performed to mix the carbon-containing biomass material with a solid-state nitrogen-containing precursor via a solid-phase mixing method to form a mixture. As a result, common issues in a liquid-phase mixing process such as aggregation phenomenon caused by inhomogeneously mixing and poor battery performance caused by a residual dispersant (to achieve well-mixed in liquid-phase) adsorbed on a material surface can be prevented. Moreover, the solid-phase mixing process can omit other complicated processes (such as a water-removing process needed for a liquid-phase mixing process) to increase process stability. In some embodiments, solid-phase mixing can be performed via a homogenizer, but the invention is not limited thereto. In some other embodiments, solid-phase mixing can also be performed using a mortar. In the present embodiment, the ratio of the carbon-containing biomass material and the solid-state nitrogen-containing precursor is, for instance, 1:10 by weight. In the present embodiment, the mixture may be in solid-state. In the present embodiment, the material of the solid-state nitrogen-containing precursor can include an organic solid-state nitrogen source, an inorganic solid-state nitrogen source, or a combination thereof. In the present embodiment, the organic solid-state nitrogen source can include hexamethylenetetramine ($C_6H_{12}N_4$), ammonium benzoate ($C_6H_5COONH_4$), ammonium carbonate (($NH_4)_2CO_3$), ammonium citrate ($HOC(CO_2NH_4)(CH_2CO_2NH_4)_2$), ammonium formate ($HCO_2NH_4$), naphthalene carbonitrile ($C_{11}H_7N$), naphthalene dinitrile ($C_{10}H_6(CN)_2$), naphthalimide ($C_{12}H_7NO_2$), or a combination thereof. The inorganic solid-state nitrogen source can be an inorganic nitrate such as ammonium nitrate ($NH_4NO_3$) or other suitable inorganic nitrates.

Next, step S104 is performed to perform a sintering process on the mixture to form a nitrogen-doped biomass carbon. As a result, the structural defects of the carbon-containing biomass material can be repaired by performing nitrogen-doping via the steps above such that when nitrogen-doped biomass carbon is used as the anode material of a secondary battery, the effects of high capacity and low irreversible capacity are achieved. As a result, the secondary battery (lithium/sodium ion battery) has good rapid charge/discharge feature, low irreversible capacitance, high capacity, and high cycle stability. In the present embodiment, the nitrogen content of the nitrogen-doped biomass carbon can be greater than or equal to 0.05 mol % and less than or equal to 10 mol %.

In the present embodiment, the nitrogen-doped biomass carbon may include pyridinic N bond and pyrrolic N bond. As shown in FIG. 2, the binding energy of pyridinic N is 398.1 eV to 399.3 eV, and the pyridinic N bond can be represented by formula (1) below; and the binding energy of pyrrolic N is 399.8 eV to 401.2 eV, and the pyrrolic N bond can be represented by formula (2) below.

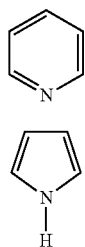

formula (1)

formula (2)

In the present embodiment, the nitrogen-doped biomass carbon formed by the above nitrogen-doping process has a pyridinic N bond (as shown in FIG. 2A). Since pyridinic N bond is suitable for storing lithium/sodium ions, the nitrogen-doped biomass carbon has good electrical performance. Moreover, although the carbon-containing biomass material not doped with nitrogen, it also has a small amount of the nitrogen element after sintering, but a pyridinic N bond is absent (as shown in FIG. 2B), and therefore electrical performance is worse.

In the present embodiment, the temperature of the sintering process is, for instance, greater than or equal to 500° C. and less than or equal to 1000° C. In the present embodiment, the time of the sintering process is, for instance, greater than or equal to 0.5 hours and less than or equal to 10 hours. In the present embodiment, the sintering process can be performed using the steps below, but the invention is not limited thereto. First, the temperature is increased to 500° C. and maintained for 5 hours to perform a pre-carbonization step. Next, an inert gas is introduced, and the temperature is increased to 800° C. in this environment and maintained for 2 hours to complete the sintering process. The inert gas is, for instance, helium (He), neon (Ne), argon (Ar), or a combination thereof, but the invention is not limited thereto. In the present embodiment, the sintering process can be performed at atmospheric pressure, and therefore a special process (such as low pressure or vacuum environment) is not needed for nitrogen-doping. As a result, the yield of the nitrogen-doped biomass carbon is increased and the fabricating cost thereof is reduced.

In some embodiments, after the nitrogen-doped biomass carbon is formed, a polishing process (i.e., step S106) can be optionally performed on the nitrogen-doped biomass carbon to form a fine powder nitrogen-doped biomass carbon. In some embodiments, solid-state polishing can be performed on the nitrogen-doped biomass carbon using a high-speed polishing machine, but the invention is not limited thereto.

In some embodiments, after the polishing process is performed, a screening process (i.e., step S108) can be optionally performed on the nitrogen-doped biomass carbon via a sieve. In the present embodiment, the screening process can be performed using a 325-mesh sieve, the aperture of the sieve is, for instance, 0.044 mm, and the screening process is, for instance, performed using a screen shaker.

Based on the above, in the embodiments above, a carbon-containing biomass material and a solid-state nitrogen-containing precursor are mixed via a solid-phase mixing method first to form a mixture, and then a sintering process is performed on the mixture to form a nitrogen-doped biomass carbon for the anode material of a secondary battery. As a result, the effect of nitrogen-doping can be achieved without a complicated special process, such that the structure of the nitrogen-doped biomass carbon is stable, and the process thereof has the advantages of being simple and environmentally friendly. Moreover, the nitrogen-doped biomass carbon formed by the process has a pyridinic N bond, and since pyridinic N bond is suitable for storing lithium/sodium ions, the nitrogen-doped biomass carbon has good electrical performance.

The features of the invention are more specifically described in the following with reference to experimental example 1 and comparative example 1. Although the following experimental example 1 is described, the materials used and the amount and ratio thereof, as well as handling details and handling process . . . etc., can be suitably modified without exceeding the scope of the invention. Accordingly, restrictive interpretation should not be made to the invention based on experimental example 1 described below.

Experimental Example 1

First, 0.73 g of coffee ground and 7.27 g of hexamethylenetetramine ($C_6H_{12}N_4$) were placed in a mortar and mixed homogeneously to form a mixture. Next, the mixture was carbonized via a high-temperature furnace and heated to 500° C. at a rate of 5° C. per minute in an Ar protective environment. The temperature was maintained for 5 hours, and then the mixture was heated to 800° C. at the same heating rate. The temperature was maintained for 2 hours, and lastly the mixture was naturally cooled to room temperature to form a nitrogen-doped biomass carbon. Next, a polishing process was performed on the nitrogen-doped biomass carbon using a polishing machine to form fine powder nitrogen-doped biomass carbon. Next, screening was performed using a 0.044-mm sieve and a screen shaker to obtain the nitrogen-doped biomass carbon of experimental example 1.

Comparative Example 1

First, 8 g of coffee ground was used as a carbon-containing biomass material. Next, the coffee ground was carbonized via a high-temperature furnace and heated to 500° C. at a rate of 5° C. per minute in an Ar protective environment. The temperature was maintained for 5 hours, and then the mixture was heated to 800° C. at the same heating rate. The temperature was maintained for 2 hours, and lastly the mixture was naturally cooled to room temperature to form an undoped biomass carbon. Next, a polishing process was performed on the undoped biomass carbon using a polishing machine to form fine powder undoped biomass carbon. Next, screening was performed using a 0.044-mm sieve and a screen shaker to obtain the undoped biomass carbon of comparative example 1.

Experiment 1

An X-ray photoelectron spectroscopy (XPS) analysis was performed on experimental example 1 and comparative example 1 to obtain the binding energy analysis spectra of the $N_{1s}$ orbital of experimental example 1 and comparative example 1. The analysis results are shown in FIG. 2A and FIG. 2B. Moreover, the ratio of the carbon atom, oxygen atom, and nitrogen atom of experimental example 1 and comparative example 1 can be obtained via an XPS analysis. The analysis result is shown in Table 1.

As shown in FIG. 2A, the nitrogen-doped biomass carbon of experimental example 1 contains pyridinic N and pyrrolic N bonds, wherein the binding energy of pyridinic N is 398.1 eV to 399.3 eV and the binding energy of pyrrolic N is 399.8 eV to 401.2 eV. As shown in FIG. 2B, the undoped biomass carbon of comparative example 1 contains a pyrrolic N bond and does not contain a pyridinic N bond.

TABLE 1

|  | Carbon atom (wt %) | Oxygen atom (wt %) | Nitrogen atom (wt %) |
|---|---|---|---|
| Experimental example 1 | 78.09 | 15.07 | 6.17 |
| Comparative example 1 | 78.35 | 19.42 | 2.23 |

It can be known from Table 1 that, the nitrogen atom content of experimental example 1 is significantly higher than that of comparative example 1. As a result, it can be verified that nitrogen can be successfully doped in the carbon-containing biomass material via the solid-phase mixing and sintering process used in experimental example 1.

Lithium Ion Battery

Experiment Example A

A lithium ion battery was assembled using the anode material for a lithium ion battery of experimental example 1, and in the present experiment, a button cell lithium ion battery is exemplified, but the invention is not limited thereto. Specifically, the steps of assembling the lithium ion battery are as described below. First, the nitrogen-doped biomass carbon of experimental example 1 was added in a solvent (such as N-methylpyrrolidone) to form a slurry. Next, the slurry was coated on a copper foil to form an anode sheet. Next, the anode sheet was placed in a mold for a button cell, and an electrolyte solution for a lithium ion battery was added. Next, a polypropylene/polyethylene (PP/PE) bilayer membrane used as a separator was covered on the electrolyte solution. Lastly, a cathode material (such as lithium metal) was covered on the separator, and a tableting process was performed to form the lithium ion battery of experimental example A.

Comparative Example A

Comparative example A was formed using the same assembling steps of the lithium ion battery of experimental example A, and the difference is only that the nitrogen-doped biomass carbon of experimental example 1 was replaced with the undoped biomass carbon of comparative example 1.

Sodium Ion Battery

Experimental Example B

A sodium ion battery was assembled using the anode material for a sodium ion battery of experimental example 1, and in the present experiment, a button cell sodium ion battery is exemplified, but the invention is not limited thereto. Specifically, the steps of assembling the sodium ion battery are as described below. First, the nitrogen-doped biomass carbon of experimental example 1 was added in a solvent (such as N-methylpyrrolidone) to form a slurry. Next, the slurry was coated on a copper foil to form an anode sheet. Next, the anode sheet was placed in a mold for a button cell, and an electrolyte solution for a sodium ion battery was added. Next, a polypropylene/polyethylene (PP/PE) bilayer membrane used as a separator was covered on the electrolyte solution. Lastly, a cathode material (such as sodium metal) was covered on the separator, and a tableting process was performed to form the sodium ion battery of experimental example B.

Comparative Example B

Comparative example B was formed using the same assembling steps of the sodium ion battery of experimental example B, and the difference is only that the nitrogen-doped biomass carbon of experimental example 1 was replaced with the undoped biomass carbon of comparative example 1.

<Cycle Life Test>

A cycle life test was performed on the lithium ion batteries of experimental example A and comparative example A and the sodium ion batteries of example B and comparative example B. The experimental results are respectively shown in FIG. 3A and FIG. 3B. FIG. 3A and FIG. 3B are respectively the relationship between charge/discharge cycle number and specific capacity (unit: mAh/g) of a lithium ion battery and a sodium ion battery, wherein the potential of each cycle was scanned from 0.001 V to 2.0 V.

It can be known from FIG. 3A and FIG. 3B that, the specific capacities of experimental example A and experimental example B are respectively better than those of comparative example A and comparative example B. That is, when nitrogen-doped biomass carbon is used as the anode material for a lithium/sodium ion battery, the cycle life of the battery is significantly increased, indicating nitrogen-doped biomass carbon can effectively increase battery performance.

<Stability Test>

Figures 4A, 4B:
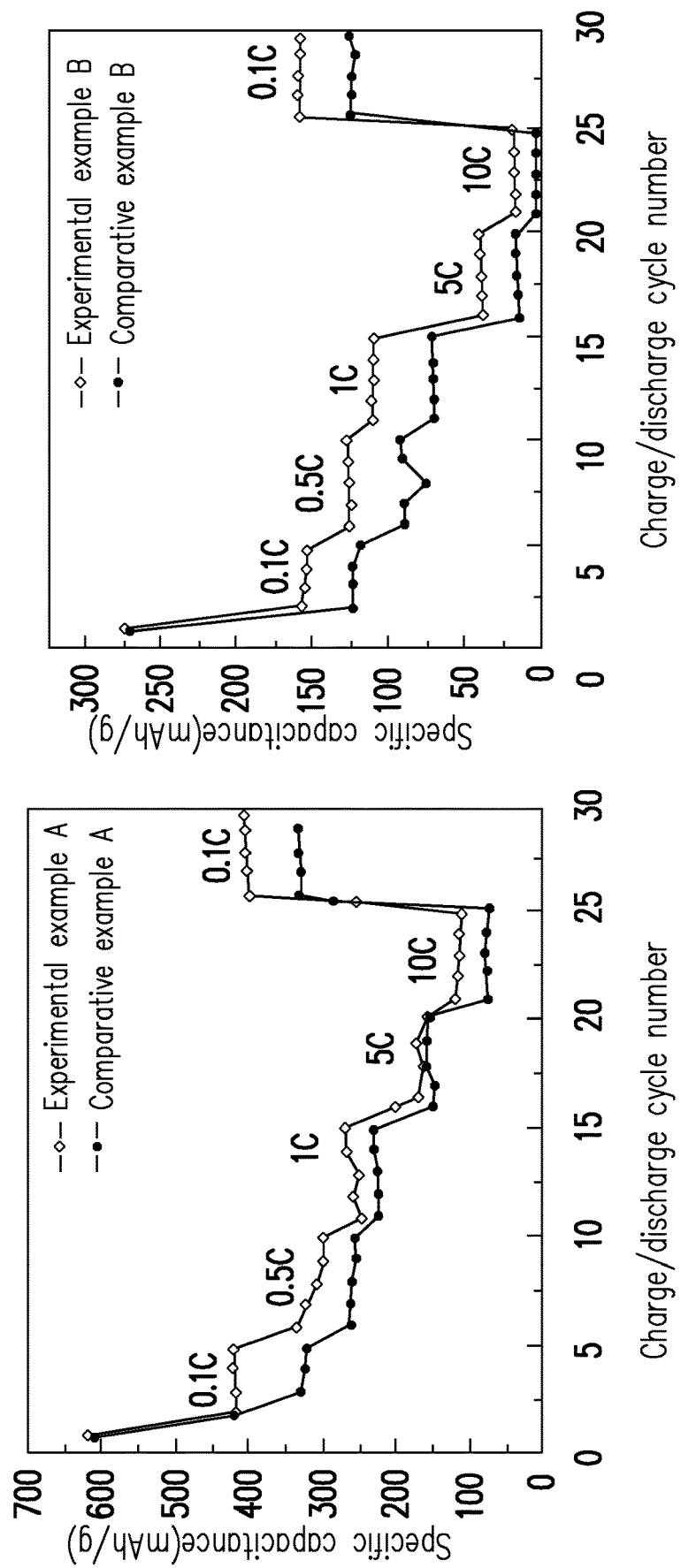
FIG. 4A and FIG. 4B are respectively the relationship between charge/discharge cycle number and capacity of a lithium ion battery and a sodium ion battery in a charge/discharge experiment at different rates.

A stability test was performed on the lithium ion batteries of experimental example A and comparative example A and the sodium ion batteries of example B and comparative example B. The experimental results are respectively shown in FIG. 4A and FIG. 4B. FIG. 4A and FIG. 4B are respectively the relationship between charge/discharge cycle number and capacity of a lithium ion battery and a sodium ion battery in a charge/discharge experiment at different rates, wherein the potential of each cycle was scanned from 0.001 V to 2.0 V, and testing was respectively performed at the charge/discharge rates of 0.1 C, 0.5 C, 1 C, 5 C, and 10 C, wherein 1 C is a certain value and can be a theoretical ratio capacitance value (such as 372 mAh/g), and 0.1 C represents 1/10 of 1 C.

It can be known from FIG. 4A and FIG. 4B that, when nitrogen-doped biomass carbon is used as the anode material of a lithium/sodium ion battery (experimental example A and experimental example B), better electrical performance is achieved in high-speed charge/discharge than when undoped biomass carbon is used as the anode material for a lithium/sodium ion battery (comparative example A and comparative example B), indicating nitrogen-doped biomass carbon has good structural stability, and therefore good electrochemical performance can be achieved.

<AC Impedance Test>

Figure 5A:
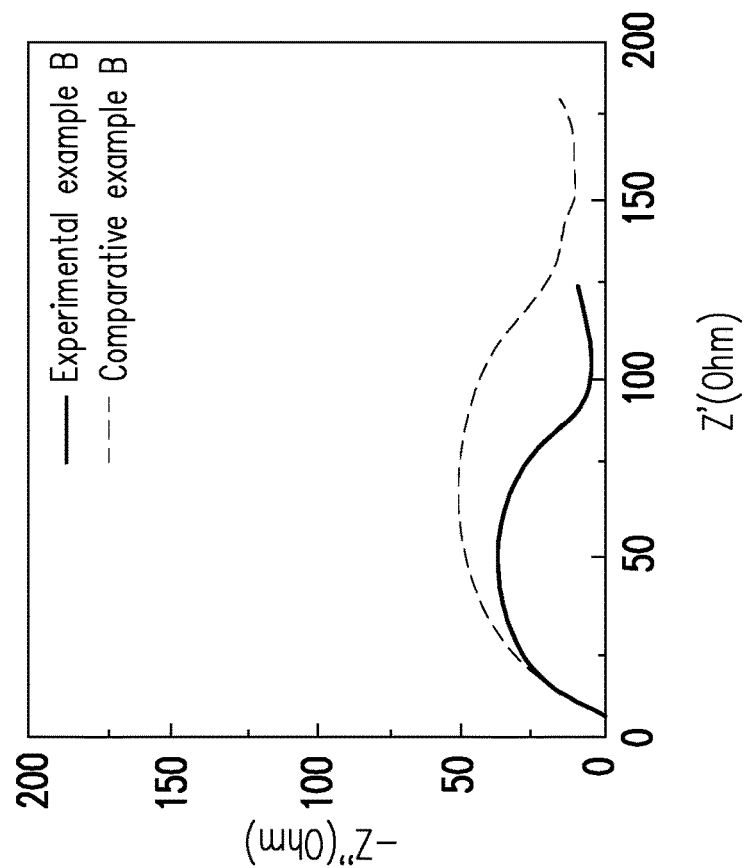
FIG. 5A and FIG. 5B are respectively graphs of the AC impedance of a lithium ion battery and a sodium ion battery.
Figure 5B:
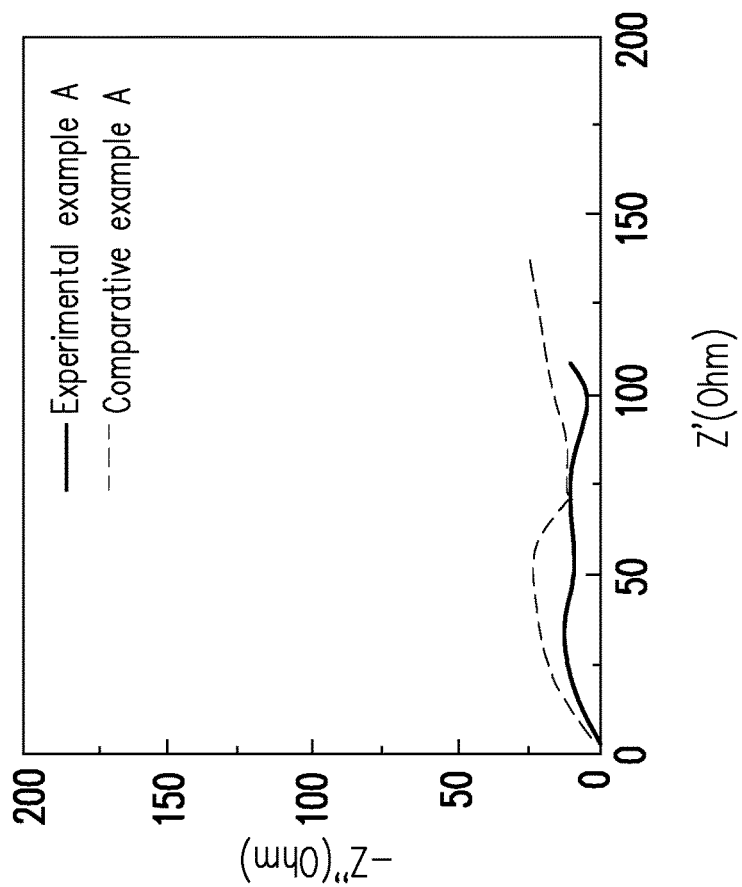

An AC impedance test was performed on the lithium ion batteries of experimental example A and comparative example A and the sodium ion batteries of example B and comparative example B. The experimental results are respectively shown in FIG. 5A and FIG. 5B. FIG. 5A and FIG. 5B are respectively graphs of the AC impedance of a lithium ion battery and a sodium ion battery.

Specifically, an AC impedance test included measuring the impedance value by performing two-electrode AC impedance in a frequency range of 0.01 Hz to 10000 Hz after the lithium ion batteries of experimental example A and comparative example A and the sodium ion batteries of example B and comparative example B were completely discharged at a fixed current, wherein the resulting raw data is impedance value and phase angle, and capacitive impedance Z″ (ohm, Ω) and resistance Z′ (ohm, Ω) can be obtained after conversion.

Referring to FIG. 5A and FIG. 5B, the AC performances of the lithium ion batteries of experimental example A and comparative example A are respectively 75.1Ω and 98.4Ω; and the AC performances of the sodium ion batteries of experimental example B and comparative example B are respectively 101.2Ω and 159.8Ω. Therefore, lower impedance can be achieved in both lithium ion battery and sodium ion battery by using a nitrogen-doped biomass carbon as the battery anode material. As a result, the performance in an electrochemical test is better so as to achieve better capacity and cycle life.

Based on the above, in the method of fabricating an anode material for a secondary battery in the embodiments above, a carbon-containing biomass material and a solid-state nitrogen-containing precursor are mixed via a solid-phase mixing method first to form a mixture, and then a sintering process is performed on the mixture to form a nitrogen-doped biomass carbon for the anode material of a secondary battery. As a result, the effect of nitrogen-doping can be achieved without a complicated special process, such that the structure of the nitrogen-doped biomass carbon is stable, and the process thereof has the advantages of being simple and environmentally friendly. Moreover, the solid-phase mixing process can prevent common issues in a liquid-phase mixing process such as aggregation phenomenon caused by inhomogeneously mixing and poor battery performance caused by a residual dispersant (to achieve well-mixed in liquid-phase) adsorbed on a material surface. Moreover, the solid-phase mixing process can omit other complicated processes (such as a liquid-phase mixing process requiring a water-removing process) to increase process stability.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method of fabricating an anode material for a secondary battery, comprising:
providing a carbon-containing biomass material;
mixing the carbon-containing biomass material with a solid-state nitrogen-containing precursor via a solid-phase mixing method to form a mixture; and
performing a sintering process on the mixture to form a nitrogen-doped biomass carbon,
wherein the solid-state nitrogen-containing precursor comprises an organic solid-state nitrogen source, an inorganic solid-state nitrogen source, or a combination thereof, and a weight ratio of the carbon-containing biomass material and the solid-state nitrogen-containing precursor is 1:10.

2. The method of fabricating the anode material for the secondary battery of claim 1, wherein the carbon-containing biomass material comprises a coffee ground, a coconut shell, a dead leaf, or a combination thereof.

3. The method of fabricating the anode material for the secondary battery of claim 1, wherein the organic solid-state nitrogen source comprises hexamethylenetetramine, ammonium benzoate, ammonium carbonate, ammonium citrate, ammonium formate, naphthalene carbonitrile, naphthalene dinitrile, naphthalimide, or a combination thereof.

4. The method of fabricating the anode material for the secondary battery of claim 1, wherein the inorganic solid-state nitrogen source comprises inorganic nitrate.

5. The method of fabricating the anode material for the secondary battery of claim 1, wherein a temperature of the sintering process is greater than or equal to 500° C. and less than or equal to 1000° C.

6. The method of fabricating the anode material for the secondary battery of claim 1, wherein a time of the sintering process is greater than or equal to 0.5 hours and less than or equal to 10 hours.

7. The method of fabricating the anode material for the secondary battery of claim 1, further comprising:
performing a polishing process on the nitrogen-doped biomass carbon after the nitrogen-doped biomass carbon is formed.

8. The method of fabricating the anode material for the secondary battery of claim 7, further comprising:
performing a screening process on the nitrogen-doped biomass carbon via a sieve after the polishing process is performed.

9. The method of fabricating the anode material for the secondary battery of claim 1, wherein the nitrogen-doped biomass carbon comprises pyridinic N bond and pyrrolic N bond.

10. The method of fabricating the anode material for the secondary battery of claim 1, wherein a nitrogen content of the nitrogen-doped biomass carbon is greater than or equal to 0.05 mol % and less than or equal to 10 mol %.

11. The method of fabricating the anode material for the secondary battery of claim 1, wherein the secondary battery comprises a lithium ion battery or a sodium ion battery.

* * * * *